3,562,094
LAMINATE OF ELASTOMER AND POLYETHYLENE TEREPHTHALATE ALSO METHOD OF MAKING SAME
Chester T. Chmiel, Newfoundland, N.J., assignor to Uniroyal, Inc., a corporation of New Jersey
No Drawing. Filed Sept. 27, 1965, Ser. No. 490,637
Int. Cl. B32b 27/36, 27/06
U.S. Cl. 161—231         9 Claims

ABSTRACT OF THE DISCLOSURE

Diolefin polymer elastomers are firmly bonded to poly(ethylene terephthalate) by treating the latter with a negatively substituted acetic acid at a temperature at or in the vicinity of the glass transition temperature of the polyester and then contacting the treated polyester with a diolefin polymer elastomer stock containing reagents capable of reacting to produce resorcinol-formaldehyde type resins.

---

This invention relates to a new and improved method of bonding flat-shaped bodies, such as films and sheets, of poly(ethylene terephthalate) to elastomers. More particularly the invention teaches treating the films and specially compounding said elastomer so as to give better adhesion to ane another.

Rubber liners and containers, otherwise useful as barriers, are susceptible to degradation from chemical and biological reagents and transmit water vapor. By laminating these rubbers with poly(ethylene terephthalate) film, a highly impermeable and exceptionally resistant material, these disadvantages may be readily overcome.

The adhesion of plastic films to elastomers has been the subject of intensive research. In British Pat. 802,077 it was taught that poly(ethylene terephthalate) foils could be joined by first coating with a compound having high solvent capacity such as trichloroacetic acid.

In U.S. Pat. 3,022,192 the addition of chromic acid to chloroacetic acid to permit bonding to other plastic sheeting is suggested.

In U.S. Pat. 2,994,671 the bonding poly(ethylene terephthalate) to natural and synthetic rubbers is discussed. Here the plastic film is first contacted with a multicomponent aqueous dispersion, which, after drying is contacted with the rubber stock. Other treatment techniques include contacting with a strong hot alkaline solution (U.S. Pat. 2,764,502) and vinyl trichloro silane (U.S. Pat. 2,285,085), and priming with specific primers, viz, an organic polyisocyanate and a latex-resole solution (U.S. Pat. 3,060,078).

The above procedures have not proven to be effective for bonding poly(ethylene terephthalate) to natural rubber or the conjugated diolefin polymer synthetic rubbers, because they are only useful for the specific applications described or are too complex for commercial application.

In accordance with the instant invention it has been discovered that the aforesaid rubbers may be firmly adhered to poly(ethylene terephthalate) by first treating the film with a negatively substituted acetic acid at a temperature at or in the vicinity of the glass transition temperature and thereafter contacting it with a natural or conjugated diolefin polymer synthetic rubber stock containing reagents which react to produce resorcinol-formaldehyde type resins.

Examples of the negatively substituted acetic acids are the mono-, di-, and trihalo-substituted acetic acids, particularly the bromo- and chloro-substituted acids. Other substitutions include phenyl and phenoxy radicals. Most preferably at least one substitution is on the α-carbon Specific examples are monochloroacetic acid, dichloroacetic acid, trichloroacetic acid, trifluoroacetic acid, 2,4-dichlorophenoxyacetic acid, monobromoacetic acid, dibromoacetic acid, tribromoacetic acid, phenylacetic acid, diphenylacetic acid, and triphenylacetic acid.

The acids defined above are particularly important in the practice of the invention. Other strong acids, e.g., acetic acid, propionic acid, butyric acid, nitric acid, sulfuric acid and phosphoric acid, do not develop good adhesion. Nor are other poly(ethylene terephthalate) solvents, e.g., o-chlorophenol, effective.

Aqueous solutions of the negatively substituted acetic acids are preferred, though inert organic solvents which dissolve the acid and boil above the film treating temperature may be used.

Generally, the concentration of the acid in the treating solution is from 5% to 50%, preferably from 10% to 25% by weight and the temperature is from 50 to 100° C., preferably from 65 to 90° C. and most desirably from 75 to 83° C. The glass transition temperature is about 80° C. Contact of the film with the solution should be at least 1 minute, preferably from 5 to 15 minutes. Excessively long periods, i.e., over 30 minutes, should be avoided since they tend to make the film brittle. As will be apparent to those skilled in the art, the longer immersion times are employed where lower temperatures and more dilute acid solutions are employed.

After contact with the acid the poly(ethylene terephthalate) is washed, preferably with distilled water, and dried.

The rubbers or elastomers suitable for use in the invention may be described as conjugated diolefin polymer rubbers, in which category are included natural rubber and homopolymers of such conjugated diolefins as butadiene-1,3-isoprene, 2,3-dimethyl butadiene-1,3, and copolymers of such diolefins with up to 50% (by weight of the copolymer) of at least one copolymerizable monoethylenically unsaturated monomer, such as styrene, acrylonitrile, methyl methacrylate, acrylic acid, vinylpyridine. The diolefin polymer may be of the so-called stereospecific kind (e.g., cis-polyisoprene) or of the emulsion kind (e.g., emulsion polybutadiene). Mixtures of the foregoing rubbers may be employed if desired.

The rubber as employed in the invention is, of course, compounded for sulfur vulcanization in the conventional manner, that is, contains the usual sulfur or sulfur-containing curatives, accelerators of sulfur-vulcanization, and such accessory compounding ingredients as fillers or pigments (e.g., carbon black, silica), plasticizers or extenders, antioxidants, etc., in conventional amounts. In addition, there are included the aforementioned ingredients to form resorcinol-formaldehyde type resin upon heating to the elevated temperatures required for curing. These ingredients are designated as methylene acceptors (hereinafter referred to as Type I chemicals) and methylene donors (hereinafter referred to as Type II chemicals); at least one chemical of each type is employed.

The Type I chemical (methylene acceptor) may be resorcinol or similar material in non-resinous or resinous form. Preferred Type I materials include resorcinol, condensation products of resorcinol and acetone, m-aminophenol, m-phenylenediamine, phloroglucinol, resorcinol monoacetate, resorcinol diacetate, 1,5-naphthalenediol, partially reacted resorcinol-formaldehyde resins (see U.S. Pat. 3,256,137, A. C. Danielson), condensation products of resorcinol and a dialkyl ketone (especially a 2-alkanone having 3–6 carbon atoms such as acetone, methyl ethyl ketone, methyl isobutyl ketone, and the like; see U.S. Pat. 3,281,311, P. T. Paul), or a condensation product of resorcinol with an alkyl aldehyde having 2 to 4 carbon atoms or benzaldehyde (examples of alkyl aldehydes are acetaldehyde, propionaldehyde, n-butyraldehyde, etc.; see U.S. Pat. 3,266,970, P. T. Paul).

As indicated, the foregoing Type I chemicals are compounded in the vulcanizable rubber stock, to which the acid-treated polyester material is to be adhered, along with a Type II chemical (methylene donor). The Type II chemicals that may be used include trimeric methylaminoacetonitrile, also called 1,3,5-tris-(cyanomethyl)-hexahydro-s-triazine (see U.S. Pat. 3,018,207, Jan. 23, 1962, A. C. Danielson). Also useful Type II chemicals are 1 - aza - 3,7 - dioxabicyclo [3.3.0] octane, 1-aza-5-methyl-3,7-dioxabicyclo [3.3.0] octane, 1-aza-5-ethyl-3,7-dioxabicyclo [3.3.0] octane, 1-aza-5-n-propyl-3,7-dioxabicyclo [3.3.0] octane, 1-aza-5-isopropyl-3,7-dioxabicyclo [3.3.0] octane, 1-aza-5-methylol-3,7-dioxabicyclo [3.3.0] octane, 1 - aza - 5 - beta-hydroxyethyl-3,7-dioxabicyclo [3.3.0] octane, 1 - aza-5-acetoxymethyl-3,7-dioxabicyclo [3.3.0] octane and 1-aza-5-methoxymethyl-3,7-dioxabicyclo [3.3.0] octane (see U.S. Pat. 3,256,137, A. C Danielson). Also suitable as Type II chemicals are 1,3-oxazolidines, bis-(1,3-oxazolidino)methanes, octahydro-1,3-benzoxazoles, tetrahydro-1,3-oxazines, dialkylaminomethyl alkyl ethers and diallylaminomethyl alkyl ethers (examples are 4,4-dimethyl-1,3-oxazolidine, 3-phenylcarbamyl - 4,4-dimethyl-1,3-oxazolidine), bis(4,4-dimethyl-1,3-oxazolidino)methane, N-n-butyl-5(6)-cyano octahydro-1,3-benzoxazole, N-n-butyl-5(6)-vinyl octahydro-1,3-benzoxazole, 3-n-butyl tetrahydro-1,3-oxazine, diisopropylaminomethyl ethyl ether, and diallylaminomethyl ethyl ether (see Canadian Pat. 703,198. A. C. Danielson). It is desired to mention, as suitable Type II chemicals, 1,8-di-(methyleneamino)-p-methane or an azomethine having the general formula

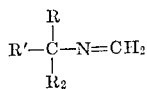

where R, R' and $R_2$ are alkyl having 1 to 8 carbon atoms, phenyl, benzyl or 2-phenylethyl (e.g., t-butylazomethine, t-octylazomethine, tribenzylmethylazomethine, etc. as per U.S. Pat. 3,097,110, Danielson, July 9, 1963). Similarly there may be employed as Type II substances the N-methylol carboxylic acid amides, particularly the N-methylolamides of aliphatic monocarboxylic acids having 2 to 9 carbon atoms and the N-methylolcyclicimides of dicarboxylic acids (e.g., N-methylolacetamide, N-methylolacrylamide, N-methylolsuccinimide, N-methylol-phthalimide, etc. per U.S. Pat. 3,097,109, Danielson, July 9, 1963). Other Type II chemicals that may be used in the invention are the N,N',N''-trisubstituted cyclotrimethylenetriamines, N-disubstituted-N'-disubstituted diaminomethanes, N,N'-disubstituted imidazolidines, and N,N'-disubstituted hexahydropyrimidines (e.g., N,N',N''-trimethylcyclotrimethylenetriamine, N,N',N'' - tri - n-hexylcyclotrimethylenetriamine, N,N',N'' - tribenzylcyclotrimethylenetriamine, N,N',N''-tris (3-isopropoxypropyl) cyclotrimethylenetriamine, bis(di - ethylamino)methane, bis(hexamethyleneimino)methane, bis(2,3 - dimethyl-1-morpholyl)methane, N,N'-di-n-hexylimidazolidine, N,N'-dibenzylimidazolidine, N,N' - di-n-hexylhexahydropyrimidine, N,N'-diphenylhexahydropyrimidine, N,N'-dibenzylhexahydropyrimidine, etc., as per U.S. Pat. 3,097,111, July 9, 1963, A. C. Danielson.

Particularly preferred methylene donors (Type II chemicals) are 1,3,5 - tris (cyanomethyl) - hexahydro-s-triazine (especially effective in combination with resorcinol as the methylene acceptor), and 5-methylol-1-aza-3,7-dioxabicyclo [3.3.0] octane (especially effective with resorcinol-acetone condensate as the methylene acceptor).

The amount of Type I and Type II components mixed with the elastomer is not critical. Generally, 0.5 to 10 parts (all quantities are expressed herein by weight, unless otherwise noted), and preferably 1 to 6 parts of the two components (total) per 100 parts of the elastomer will be mixed to the elastomer to be laminated to the poly(ethylene terephthalate). The ratio of the two components will be from 1 to 4 moles, preferably 1 to 2 moles, of the Type I chemical per mole of the Type II chemical. After assembling the acid-treated polyester, in the form of a film or sheet, in contact with the thus-compounded elastomer in the particular form dictated by the finely desired articles, the assembly is heated to vulcanize the elastomeric component. Conventional vulcanizing conditions such as 320° F.–350° F. (160–177° C.) for 5 minutes to 1 hour are suitable. The adhesion of the polyester to the adjacent vulcanized elastomeric stock is greatly improved by means of the resin formed at the vulcanizing temperature by the reaction of the Type I chemical and the Type II chemical adjacent the interface of the acid-treated polyester material and the elastomer of the laminate.

In the following examples the measure of adhesion was determined by cutting 1" wide strips of the laminate, placing the strips in an Instron Tester at room temperature, and measuring the force required to pull the film from the rubber.

EXAMPLE 1

Ten 3 x 2½ sheets of poly(ethylene terephthalate) film were immersed in the acid solutions shown in Table I below for 10 minutes at 80 °C. After the films were washed in distilled water and dried, they were pressed against SBR rubber and the laminate cured at 177° C. for 20 minutes. A laminate was similarly formed with an untreated sample of the film for comparison purposes. The rubber contained 0.5% to 1,3,5-tris-(cyanomethyl)-hexahydro-s-triazine and .6% resorcinol.

TABLE I

| Treatment | Instron pulls, lbs./in. |
|---|---|
| None | 2 |
| 15% aqueous trichloroacetic acid | 90 |
| 15% aqueous trifluoroacetic acid | 90 |
| 15% aqueous monochloroacetic acid | [1] 90 |
| 15% [2] 2,4-dichlorophenoxyacetic acid | [1] 90 |
| 50% aqueous phosphoric acid | 5 |
| 50% aqueous sulfuric acid | 13 |
| 50% aqueous acetic acid | [1] 2 |
| 50% aqueous propionic acid | 8 |
| 50% aqueous butyric acid | 7 |
| 25% o-chlorophenol in methyl amyl ketone | [1] 2 |
| 15% nitric acid | [1] 2 |
| 100% methyl ethyl ketone | 2 |

[1] As judged by hand pulls.
[2] In methyl ethyl ketone.

The samples treated with the negatively-substituted acetic acids broke in the rubber phase while the untreated film pulled off very easily from the rubber without any rubber adhering.

Except for some spotty adhesion observed in the case of sulfuric acid, the film peeled off the rubber very easily in the last eight samples.

EXAMPLE 2

This example illustrates the importance to adhesion of the incorporation into the rubber of reagents which upon heating produce a resorcinol-formaldehyde type resin.

Two Mylar films were immersed for 5 minutes at 80° C. in a 15% aqueous trifluoroacetic acid solution. After the films were washed with distilled water and dreid, one film was cured against an SBR rubber containing 0.5% 1,3,5-tris-(cyanomethyl)-hexahydro-s-triazine and 0.6% resorcinol, while the other was cured against rubber which did not contain these reagents. Excellent adhesion (i.e., about 90 lbs./in.) occurred in the case where the reagents were present in the rubber whereas no adhesion occurred in the case where these reagents were absent.

EXAMPLE 3

This example illustrates the effectiveness of another methylene donor-acceptor combination, i.e. 5-methylol-1-aza-3,7-dioxabicyclo [3.3.0] octane and the condensation product of resorcinol and acetone, respectively. The same concentrations as in the previous samples were used.

Mylar films were immersed for 10 minutes at 80° C. in the solutions shown in Table 2. The subsequent procedures were the same as described in Example 1.

TABLE 2

| Treatment: | Instron pulls, lbs./in. |
|---|---|
| None | 9 |
| 15% aqueous trichloroacetic acid | 160 |
| 15% aqueous trifluoroacetic acid | [1] 47 |

[1] Film broke.

Without any treatment, the film pulled off with no rubber attached to its surface. With acid treatment, the break occurred in the rubber. The high value for trichloroacetic acid as compared to that obtained in Example 1 is due to a tougher rubber stock used in these experiments. In the case of trifluoroacetic acid, the pull on the laminate reached 47 lbs./in. without any peeling, at which point the film broke.

EXAMPLE 4

This example illustrates the importance of the temperature of acid treatments in developing maximum adhesion.

Mylar films were contacted for 10 minutes at 60° C. or 80° C. with the solutions shown in Table 3. Subsequent procedures and rubber stocks used were the same as described in Example 1.

TABLE 3

| Treatment | Temperature, °C. | Instron pulls, lbs./in. |
|---|---|---|
| None | | 2 |
| 15% aqueous trichloroacetic acid | 60 | 60 |
| 15% aqueous trifluoroacetic acid | 60 | 10 |
| 15% aqueous trichloroacetic acid | 80 | 97 |
| 15% aqueous trifluoroacetic acid | 80 | 92 |

At 60° C. there is enhanced adhesion of Mylar to rubber as a result of acid treatments of the Mylar films. But the adhesion is spotty, and the high value of 60 lbs./in. for the trichloroacetic acid represents pockets of rubber breaks in a substantially interfacial separation between the film and rubber. At 80° C., the breaks occurred completely in the rubber.

EXAMPLE 5

This example illustrates the minimum time required for the acid treatment in order to develop good adhesion.

Mylar films are dipped into 15% trichloroacetic acid solutions at 80° C. for the times shown in Table 4. Subsequent procedures and rubber stocks used were the same as described in Example 1.

Table 4

| Time of treatment (sec.): | Adhesion (judged by hand pulls) |
|---|---|
| 1 | None. |
| 30 | Spotty. |
| 60 | Very good. |

It is seen from Table 5 that a treatment time of about 1 min. is required in order to develop good adhesion.

Having thus described my invention, what I claim and desire to protect by Letters Patent is:

1. A method of adhering poly(ethylene terephthalate) to a diolefin polymer elastomer comprising contacting the poly(ethylene terephthalate) with a solution of negatively substituted acetic acid at a temperature in the vicinity of the glass transition temperature of the poly(ethylene terephthalate), thereafter washing and drying the poly(ethylene terephthalate), laminating the thus-treated poly(ethylene terephthalate) to the elastomer in an unvulcanized state, the elastomer being compounded for vulcanization and containing a methylene donor and a methylene acceptor reactive at vulcanizing temperatures to form a resorcinol-formaldehyde type resin, heating the resulting laminate to vulcanizing temperature to vulcanize the elastomer and to convert the said methylene donor and acceptor into a resin, whereby the poly(ethylene terephthalate) becomes firmly adhered to the elastomer.

2. The method of claim 1 wherein the negatively substituted acetic acid is trichloroacetic acid.

3. The method of claim 1 wherein the negatively substituted acetic acid is trifluoroacetic acid.

4. The method of claim 1 wherein the negatively substituted acetic acid is monochloroacetic acid.

5. The method of claim 1 wherein the negatively substituted acetic acid is 2,4-dichlorophenoxyacetic acid.

6. A method of adhering a shaped poly(ethylene terephthalate) article to an elastomeric composition comprising butadiene-styrene copolymer rubber, comprising the steps of immersing the article in a solution of 5 to 50% of negatively substituted acetic acid heated to a temperature of from 50° C. to 100° C. for a period of 1 to 30 minutes, thereafter washing and drying the article, thereafter laminating the thus-treated article to said rubber compounded for sulfur vulcanization and containing a methylene donor and a methylene acceptor reactive at vulcanizing temperatures to form a resorcinol-formaldehyde type resin, and subsequently heating the laminate under pressure to a temperature sufficient to vulcanize the rubber and form the said resin, whereby the article becomes firmly adhered to the rubber.

7. A method of adhering polyester film comprising poly(ethylene terephthalate) to a diolefin polymer elastomer comprising applying an aqueous solution of 5 to 50% of negatively substituted acetic acid to the film at a temperature of about 65° to 90° C. for a period of 1 to 30 minutes, thereafter washing and drying the film, thereafter laminating the film to a diolefin polymer elastomer compounded for sulfur vulcanization and containing a methylene donor selected from the group consisting of 1,3,5-tris(cyanomethyl)hexahydro-s-triazine and 5-methyl-1-aza-3,7-dioxabicyclo [3.3.0] octane and a methylene acceptor selected from the group consisting of resorcinol, resorcinol-acetone condensation product, m-aminophenol, m-phenylenediamine, pholorglucinol, 1,5-naphthalenediol, monoacetate ester of resorcinol and diacetate ester of resorcinol, and thereafter vulcanizing the laminate.

8. A method of adhering poly(ethylene terephthalate) polyester in the form of a film to a diolefin polymer elastomer comprising immersing the film in an aqueous solution of 5 to 50% of a negatively substituted acetic acid at a temperature of about 65 to 90° C. for a period of 1 to 30 minutes, thereafter washing and drying the film, laminating the thus-treated polyester to the elastomer, the elastomer being compounded for sulfur vulcanization and containing a methylene donor and methylene acceptor reactive at vulcanizing temperature to form a resorcinol-formaldehyde type resin, and heating the laminate to vulcanizing temperature.

9. A laminate of poly(ethylene terephthalate) polyester material infused with a negatively substituted acetic acid and a vulcanized diolefin polymer rubber composition containing an in situ formed resorcinol-formaldehyde type resinous reaction product of a methylene donor and a methylene acceptor in at least the rubber composition adjacent the interface of said polyester material and rubber composition, the polyester material having been infused with a solution of said negatively substituted acetic acid followed by washing and drying prior to lamination.

References Cited

UNITED STATES PATENTS

| | | | |
|---|---|---|---|
| 3,022,192 | 2/1962 | Brandt | 117—47 |
| 3,256,137 | 6/1966 | Danielson | 161—241 |
| 3,266,970 | 8/1966 | Paul | 161—241 |
| 3,031,431 | 4/1962 | Rye | 161—231 |

FOREIGN PATENTS 575,794   5/1959   Canada _____ 156—306

JOHN T. GOOLKASIAN, Primary Examiner

W. E. HOAG, Assistant Examiner

U.S. Cl. X.R.

117—47; 156—308, 316; 161—239, 247, 257